United States Patent
Musgrave et al.

(10) Patent No.: US 6,505,193 B1
(45) Date of Patent: Jan. 7, 2003

(54) SYSTEM AND METHOD OF FAST BIOMETRIC DATABASE SEARCHING USING DIGITAL CERTIFICATES

(75) Inventors: Clyde Musgrave, Frisco, TX (US); James L. Cambier, Medford, NJ (US)

(73) Assignee: Iridian Technologies, Inc., Moorestown, NJ (US)

( * ) Notice: Subject to any disclaimer, the term of this patent is extended or adjusted under 35 U.S.C. 154(b) by 0 days.

(21) Appl. No.: 09/452,603

(22) Filed: Dec. 1, 1999

(51) Int. Cl.$^7$ .............................................. G06F 17/30
(52) U.S. Cl. ......................................................... 707/3
(58) Field of Search ........................ 707/3, 5; 713/186, 713/156, 176; 380/25, 23; 379/142.05; 382/117

(56) References Cited

U.S. PATENT DOCUMENTS

| | | | |
|---|---|---|---|
| 4,641,349 A | 2/1987 | Flom et al. ...................... 382/2 |
| 4,868,877 A | 9/1989 | Fischer ......................... 380/25 |
| 4,876,608 A | 10/1989 | Eaton ........................... 358/443 |
| 4,995,081 A | 2/1991 | Leighton et al. ............... 380/23 |
| 5,151,583 A | 9/1992 | Tokunaga et al. ......... 250/201.2 |
| 5,291,560 A | 3/1994 | Daugman ...................... 382/2 |
| 5,404,163 A | 4/1995 | Kubo ........................... 348/142 |
| 5,534,855 A | 7/1996 | Shockley et al. ......... 340/825.3 |
| 5,572,596 A | 11/1996 | Wildes et al. ................ 382/117 |
| 5,659,616 A | * 8/1997 | Sudia ........................... 380/30 |
| 5,721,781 A | 2/1998 | Deo et al. ...................... 380/25 |
| 5,802,199 A | 9/1998 | Pare, Jr. et al. ............. 382/115 |
| 5,805,712 A | 9/1998 | Davis ........................... 380/50 |
| 6,026,166 A | * 2/2000 | LeBourgeois ................ 380/47 |
| 6,181,803 B1 | * 1/2001 | Davis ........................... 380/30 |
| 6,202,151 B1 | * 3/2001 | Musgrave et al. ........... 713/170 |
| 6,256,737 B1 | * 7/2001 | Bianco et al. .............. 713/186 |

(List continued on next page.)

FOREIGN PATENT DOCUMENTS

| EP | 0 965 221 A2 | 8/1999 |
| WO | WO 97/46978 | 12/1997 |
| WO | WO 98/50875 | 11/1998 |

OTHER PUBLICATIONS

IriScan, Inc. Webpage, printed from the internet on Aug. 6, 1999, 25 pages.
Sensar, Inc. Webpage, printed from the internet on Aug. 10, 1999, 6 pages.
John Daugman Webpage, Cambridge University, Computer Laboratory, Cambridge, UK, printed from the internet on Sep. 27, 28, and 29, 1999, 34 pages.

*Primary Examiner*—Wayne Amsbury
*Assistant Examiner*—Cam-Linh T. Nguyen
(74) *Attorney, Agent, or Firm*—Woodcock Washburn LLP

(57) ABSTRACT

A system and method for conducting fast biometric database searches using iris recognition and digital certificates. Authentication of a computing platform is provided based on a digital certificates attached thereto. Fast database searching and identification of a person at the computing platform are provided based on the digital certificate which is used to point to a database partition having stored biometric images and an obtained biometric image, such as an iris template, which is compared to the stored biometric images in order to identify the person. Access to the database containing stored biometric images may be granted based on the results of the digital certificate authentication process. The use of digital certificates narrows the database search to only those individuals who have authorized access to a particular computing platform by using the digital certificates. The inclusion of the iris template allows for the reliable identification of an individual at the computing platform using digital certificates both as the secure transport method and as the means to ensure the privacy of the individual and their iris template. A level of access and other entitlements to use the computing platform may also be granted to the person based on the results of the identification process.

36 Claims, 10 Drawing Sheets

U.S. PATENT DOCUMENTS 6,289,113 B1 * 9/2001 McHugh et al. ............ 351/218
6,324,271 B1 * 11/2001 Sawyer et al. ......... 379/142.04
2001/0034836 A1 * 10/2001 Matsumoto et al. ........ 713/176
2001/0049785 A1 * 12/2001 Kawan et al. .............. 713/156

* cited by examiner

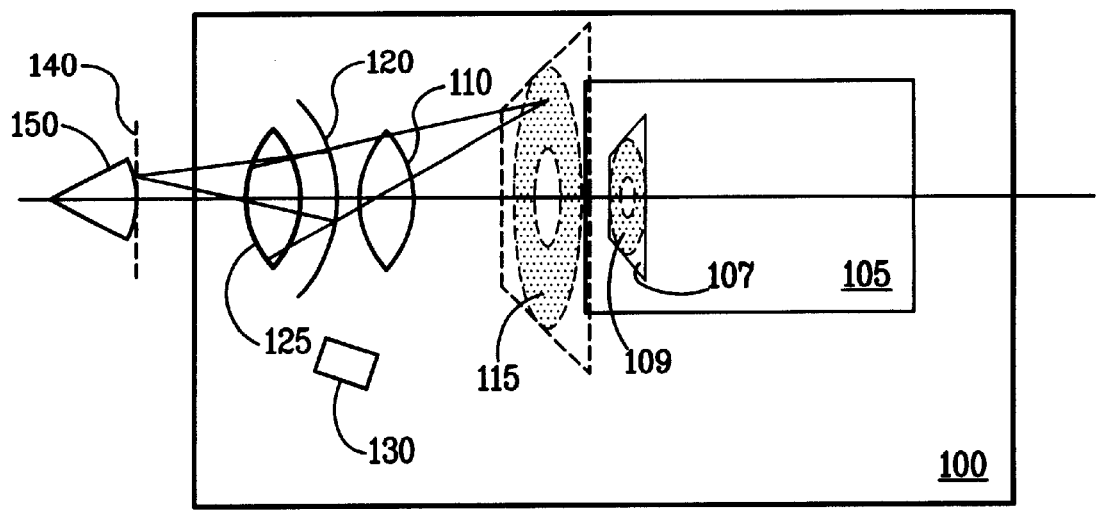
FIG. 4A
FIG. 4B
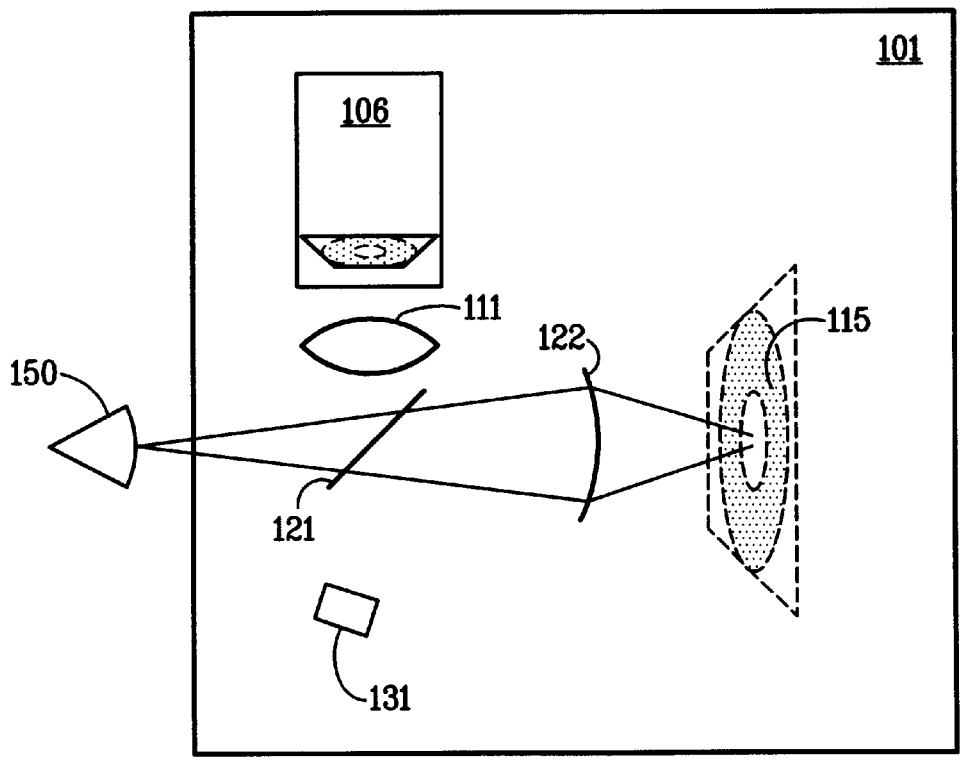

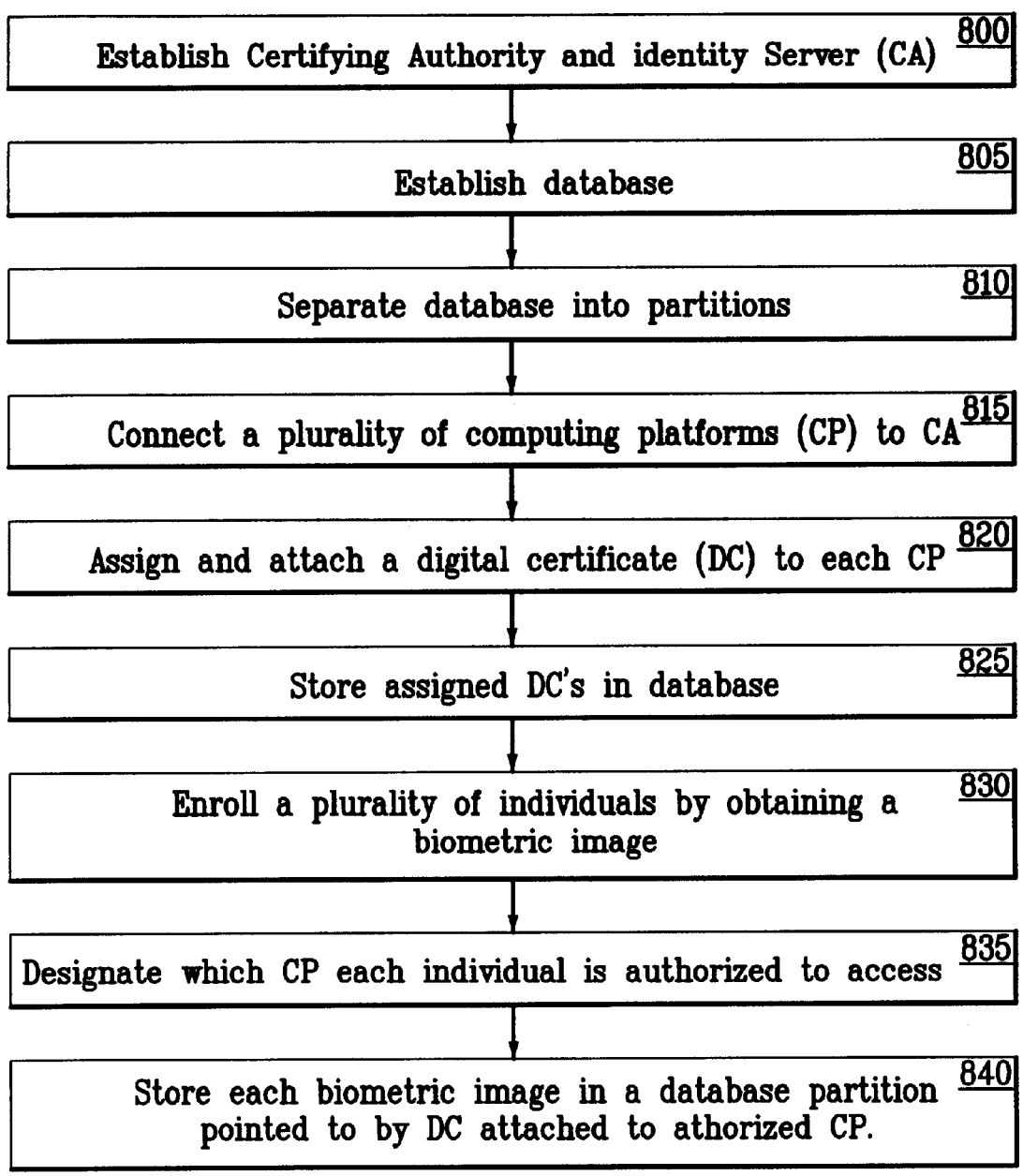

SYSTEM AND METHOD OF FAST BIOMETRIC DATABASE SEARCHING USING DIGITAL CERTIFICATES

FIELD OF THE INVENTION

The present invention relates in general to identification of physical characteristics of a human being, and particularly, the present invention relates to a system and method of fast biometric database searching using digital certificates. More particularly, the present invention relates to using iris recognition and digital certificates to conduct fast biometric database searching of relatively large databases for the identification of a subject.

BACKGROUND OF THE INVENTION

Various techniques are used for uniquely authenticating a remote server provider or computing platform. For example, encrypted passwords, account information, and Personal Identification Numbers (PIN) have been used as tools to authenticate a computing platform and to authorize a transaction originating at the computing platform.

More recently, certificates have been used to authenticate a computing platform as being an authorized platform for a particular application. Perhaps the best known public-key certificate format is X.509, which is an identity-based design. That is, it ties a public key to a computing platform, such as a distinguished name. The distinguished name is a unique string supposedly associated with a computing platform or other object. A certifying authority assigns each certificate and has the task of ensuring that each certificate is unique and that the certificate is an accurate and true label for the computing platform.

While the above authentication techniques provide a mechanism for authenticating a computing platform as being an authorized platform for a given application, these technologies do not provide for the identification of the person at the computing platform who is using the computing platform to seek services from the application server. They simply provide a token in place of identity.

Various technologies are used for uniquely identifying a person in accordance with an examination of particular attributes of either the person's interior or exterior eye. One of these technologies involves the visual examination of the particular attributes of the exterior of the iris of at least one of the person's eyes. The iris of the human eye has random patterns of striations, ciliary processes, crypts, rings, furrows and other features which have been shown capable of generating highly unique biometric templates for personal identification. In this regard, reference is made to U.S. Pat. No. 4,641,349, "Iris Recognition System", issued to Flom et al., and U.S. Pat. No. 5,291,560, "Biometric Personal Identification System Based on Iris Analysis", issued to Daugman. As made clear by these patents, the visible texture of a person's iris can be used to distinguish one person from another with great accuracy. Thus, iris recognition can be used for such purposes as controlling access to a secure facility or a bank automatic teller machine, for example. An iris recognition system involves the use of an imager to video image the iris of each person attempting access, and image processing means for comparing this iris video image with a reference iris image on file in a database.

Iris identification systems have been developed that are capable of collecting images of the iris and processing them to produce biometric templates. These templates may be used to identify human individual irises with extremely low error rates, on the order of 1 in $10^6$.

Iris recognition is widely recognized as the most powerful technology available for biometric identification of humans. Most biometric technologies are useful only for verification, implying 1:1 matching between a live biometric measurement and a single stored template. However, some biometric technologies, such as the iris recognition technology developed by IriScan®, are capable of identification, in which the live biometric is matched against N entries in a database to identify the individual without the need to provide a presumed identity or biometric token. This 1:N match can be performed for very large N due to the extremely low single-match false accept and false reject rates which characterize some biometric technologies, such as the IriScan® iris recognition technology. However, challenges are posed by 1:N matching of biometric templates when N is very large, and match times can quickly become unacceptable.

The template matching process, when viewed as a database search operation, has some very demanding requirements. First, there is no "key" that can be used to arrange the templates in the database in some advantageous way to facilitate searching. There is no way to avoid matching the unknown template against each and every database entry until the correct match is found, or the search is exhausted. Also, each match is typically performed at a number of different relative rotational alignments of the two templates. So each pair of templates really requires as many as 21 separate bit comparisons, accounting for ±28 degrees of relative rotation. For example, a typical single 300 MHz Pentium-based PC can match templates at a rate of approximately 40,000 matches in about a second or two.

This may be entirely adequate for most physical access control installations, in which the database has less than about 40,000 entries and a match time of a second or two, or longer, is acceptable. However, for large networked systems where a single access server has to process multiple simultaneous matching requests, over a secure network with a database of millions of enrollees, match times can quickly become unacceptable. Typically, an exhaustive search is performed for each unknown template, and consequently, the match speed varies directly with the processing power and inversely with the number of simultaneous requests.

There are a number of conventional strategies for increasing the match speed that yield low-confidence matching. One is "filtering", in which information like sex, birth date, etc. is used to pre-classify the unknown person to be identified. This filtering technique is used, for example, with the less accurate finger-print identification techniques. The database is partitioned according to these pre-classifications, and when the person is enrolled the biometric template is placed in the correct partition. When the person seeks to be identified, they must provide information (age, sex, etc.) to identify the database partition containing their template. However, if the pre-classification is done incorrectly, either at enrollment or later at identification, the search will be conducted over the wrong segment of the database and the person will never be found. As a result this strategy produces high false reject rates and completely unreliable results.

The matching speed can be increased through the use of multiple processors in parallel. The match speed achieved is linearly related to the speed and/or number of processors. Although this is a viable approach, it is not cost-effective. Greater gains might be achieved by designing and building specialized processors that can perform the simple XOR logic operations at very high speed. However, this speed advantage is limited by the rates at which data can be moved into and out of the processor.

Although the art of biometric recognition systems is well developed, there remain some problems inherent in this technology, particularly with biometric systems and methods characterized by 1:N matching of biometric templates when N is very large. A system and method for achieving fast, accurate, cost-effective identification in these applications is needed. Therefore, a need exists for a recognition system and fast search methodology that overcomes the drawbacks of the prior art.

SUMMARY OF THE INVENTION

The present invention is directed to a system and method for conducting fast biometric database searches using iris recognition and digital certificates. The present invention provides for the authentication of a computing platform based on digital certificates attached thereto and also for the relatively fast identification of a person at the computing platform based on the digital certificate and a biometric image, such as an iris image. A level of access and other entitlements to use the computing platform may be granted to the person based on the results of the identification process.

A system for fast biometric database searching for the identification of a person at a remote computing platform includes a database having a plurality of stored biometric images, the database being separated into a plurality of partitions. A plurality of computing platforms are connected to the database. A digital certificate is attached to each of the computing platforms and keyed to point to one of the database partitions. A biometric imager is located at each of the computing platforms for obtaining a biometric image of the subject, such as a person. Preferably an image of the iris of the eye is obtained. A certifying authority and identity server having a processor is disposed between the computing platforms and the database for authenticating the computing platform based on the digital certificate attached thereto and for identifying the person based on a comparison of the obtained biometric image to stored biometric images within the database partition designed by the digital certificate.

According to another aspect of the present invention, the certifying authority maintains and controls access to the database and assigns the digital certificates that are attached to each computing platform. The computing platform to the certifying authority authentication is accomplished using conventional techniques, such as X.9 and X.509 technologies. The iris image or template provides for accurate identification of the person and the digital certificate provides a secure transport method and as a mechanism to ensure privacy of the identity of the person and the image of the biometric trait of the person.

According to another aspect of the invention, the system and method of fast biometric database searching using digital certificates provides a database search of about one obtained biometric template comparison against about 1–10 million stored biometric templates in about 1–2 seconds using a single 300 MHz Pentium-based PC.

According to another aspect of the invention, the system of identification also includes: a handheld imaging apparatus; a first memory for storing at least one template of at least one image of an iris of at least one person's eye; a second memory for storing a template of an iris image obtained by the iris acquisition device; and a comparator for comparing the template of the iris image of the second memory with the at least one stored template of the first memory to identify the person.

According to another aspect of the invention, the comparator comprises a processor responsive to an output of the camera for comparing the template of the second memory with the at least one stored template of the first memory.

According to another aspect of the invention, the first memory, the second memory, and the comparator are disposed in a housing that is separate from the handheld iris imaging apparatus. In an embodiment, the housing is coupled to the handheld iris imaging apparatus by a wireless modem.

A method for authenticating the computing platform and of identifying a person at the computing platform comprises attaching a digital certificate to each of a plurality of computing platforms, storing a copy of the attached digital certificates with a certifying authority and identity server, initiating a transaction by the person at one of the computing platforms, obtaining an image of a biometric trait of the person, preferably obtaining an iris image of the eye, processing the obtained biometric image and the digital certificate to form a combined template, communicating the combined template to a certifying authority and identity server, providing a database containing stored biometric images of persons authorized to use the computing platform and the stored digital certificates, segregating the database into a plurality of partitions keyed to the digital certificates, comparing the communicated digital certificate to the stored digital certificates, authenticating the computing platform based on the comparison of the digital certificates, searching one or more partitions based on the partitions pointed to by the communicated digital certificate contained in the template, comparing the obtained biometric image of the template to the stored biometric images in the partition, and identifying the person based on the comparison. The method can also include authorizing a level of access or an entitlement to use the computing platform based on the identification.

According to an aspect of the present invention, the method further comprises activating an indicator if the computing platform has been authenticated and the person has been identified.

The present invention is also directed to an iris certificate (e.g., an IrisCert™ code) having a plurality of data fields including information relating to a digital certificate which identifies one or more computing platforms and points to a partition within a database and information relating to an iris image (e.g., an IrisCode™ template) obtained from a person seeking to use one of the computing platforms. The iris certificate can also include other data, such as name, address, a level of authorization, entitlements, etc.

BRIEF DESCRIPTION OF THE DRAWINGS

The foregoing and other aspects of the present invention will become apparent from the following detailed description of the invention when considered in conjunction with the accompanying drawings. For the purpose of illustrating the invention, there is shown in the drawings an embodiment that is presently preferred, it being understood, however, that the invention is not limited to the specific methods and instrumentalities disclosed. In the drawings:

FIG. 4A is a schematic diagram of the imager of FIG. 3 shown in greater detail;

FIG. 4B is a schematic diagram of another exemplary imager that can be used with the present invention;

FIG. 5 is a flowchart of an exemplary method of enrollment in accordance with the present invention;

DETAILED DESCRIPTION OF THE PREFERRED EMBODIMENTS

The present invention is directed to a system and method for performing fast biometric database searches using digital certificates. The invention is described with reference to an exemplary iris recognition system and method for iris recognition and database searching of iris templates, however, it is contemplated that the scope of the invention includes other types of biometric identification techniques having biometric templates stored in a database.

Figure 1:
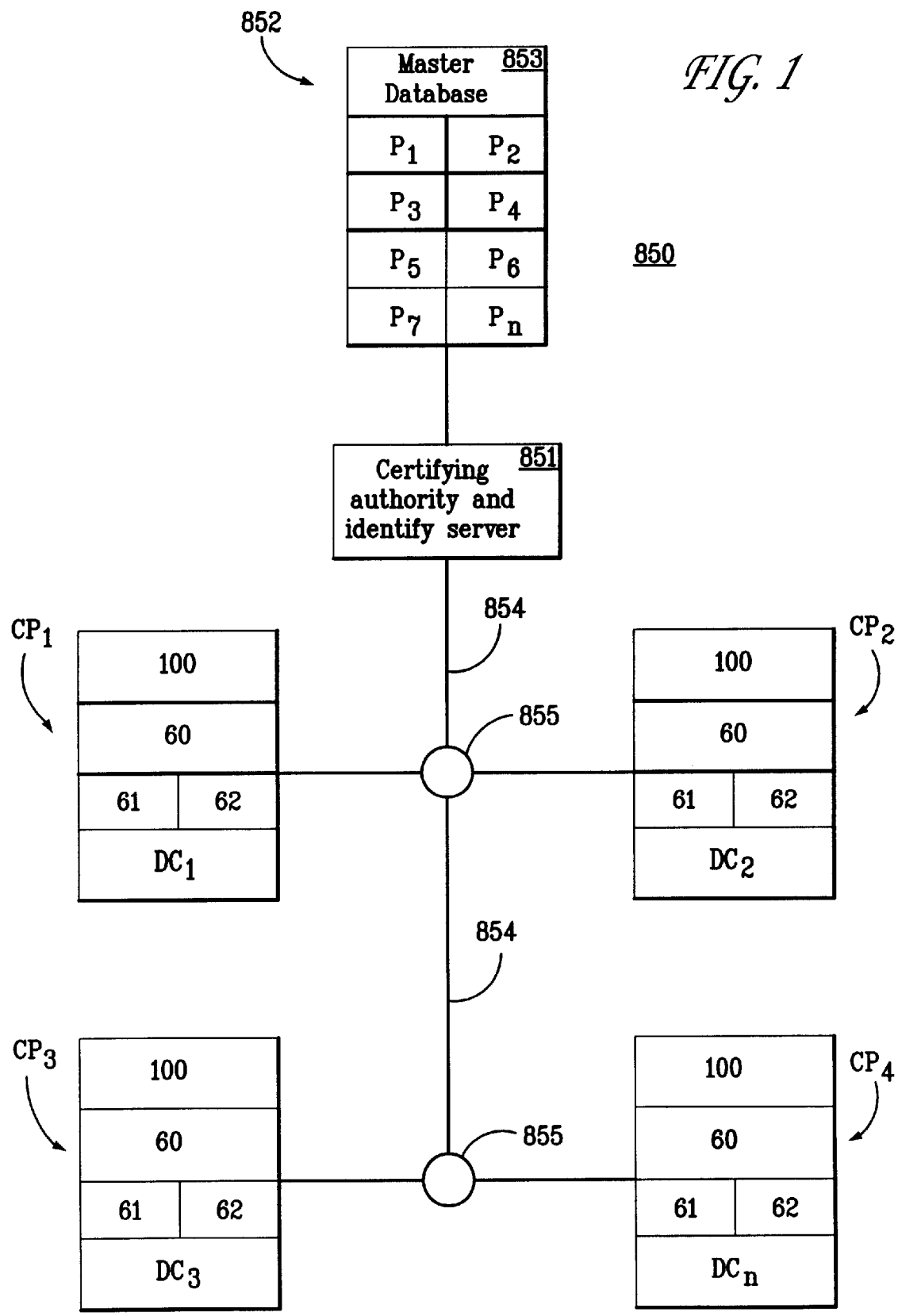
FIG. 1 is a schematic diagram of an exemplary system for fast biometric database searching using digital certificates in accordance with the present invention.

As shown in FIG. 1, the system 850 of the present invention includes a central database 852 containing stored biometric templates of a plurality of individuals enrolled for a particular application. The central database 852 is separated into a plurality of partitions ($P_1, P_2, P_3, P_4, P_n$) and can also have a master database 853. A certifying authority and identity server 851 maintains and controls access to the central database 852. A plurality of computing platforms ($CP_1, CP_2, CP_3, CP_n$) for a given application are connected to the central database 852 through one or more servers 855 connected via a communications network 854. A digital certificate ($DC_1, DC_2, DC_3, DC_n$) can be assigned by the certifying authority and identity server 851 and is attached to each of the computing platforms CP. An exemplary digital certificate can include, for example, a public-key certificate format, such as X.509. The digital certificates are also stored at the certifying authority. A biometric image acquisition device 100 is provided at each computing platform CP for obtaining an unique biometric image of a person at the computing platform CP. A processor processes the obtained image and the digital certificate DC to form a combined template. The combined template, or code, is transmitted to the certifying authority and identity server 851.

The transmitted digital certificate contained in the combined template is compared to stored digital certificates that have been assigned to computing platforms CP in order to authenticate the computing platform CP as being an enrolled computing platform for that application. The digital certificate DC is also used to point to a partition P within the central database 852. A processor at the certifying authority and identity server 851 compares the obtained biometric image to stored biometric images contained within that database partition P pointed to by the digital certificate DC in order to authenticate the identification of the person at the computing platform as an authorized user for that particular computing platform CP. A level of access and other entitlements may be granted to the person to use the computing platform CP based on the results of the authentication of the computing platform and the authentication of the identification of the person at the computing platform.

As shown in FIG. 1, the system 850 includes a plurality of computing platforms CP. Each computing platform CP includes an iris image acquisition device and a digital certificate DC. The digital certificate DC is attached to the computing platform CP using standard techniques, such as being saved as a file in the browser to communicate via a secure socket layer. Preferably, each computing platform CP includes a processor 60, such as a standard personal computer system, a display device 61, such as a video display, and an input device 62, such as a keyboard and mouse.

The digital certificate includes a character string assigned to a computing platform. The certificates preferably contain encrypted information about the computing platform that can preferably only be decrypted by the trusted certifying authority. Preferably the digital certificates are generated by the certifying authority that the sender and receiver of the application have agreed to trust. The certificate is used as proof that the computing platform is an authorized platform for the particular application, and that the data is actually coming from the computing platform to which the unique certificate was assigned. Digital certificates provide the advantage of being highly secure, in that they prove that the computing platform to which they are attached is in fact the original item to which the certificate was issued, and not some illegal or forged copy. Digital certificates are also highly user transparent. However, while digital certificates are useful in positively identifying a computing platform as being an authorized platform for a particular application, they do not necessarily identify the person at the computing platform sending the request. In fact, people have multiple and completely incompatible certificates at their home computers, business computers (fixed), and mobile computers. The personal digital assistant (PDA) should at some point have encryption and/or certificates embedded in their hardware or software operating/browser systems.

For this reason, the present invention also includes an imager that can be used as the biometric image acquisition device 100 to capture a high-quality biometric feature, such as an iris image of an eye, for the purpose of positively identifying the person at the platform. An imager 100 is located proximate to each of a plurality of computing platforms. Preferably, each imager 100 has sensors and indicators which assist the operator in aligning and focusing the device. The imager 100 also automatically captures the image when proper positioning is achieved. Preferably, the imager 100 is adapted for use as an accessory to a personal computer.

Figure 2:
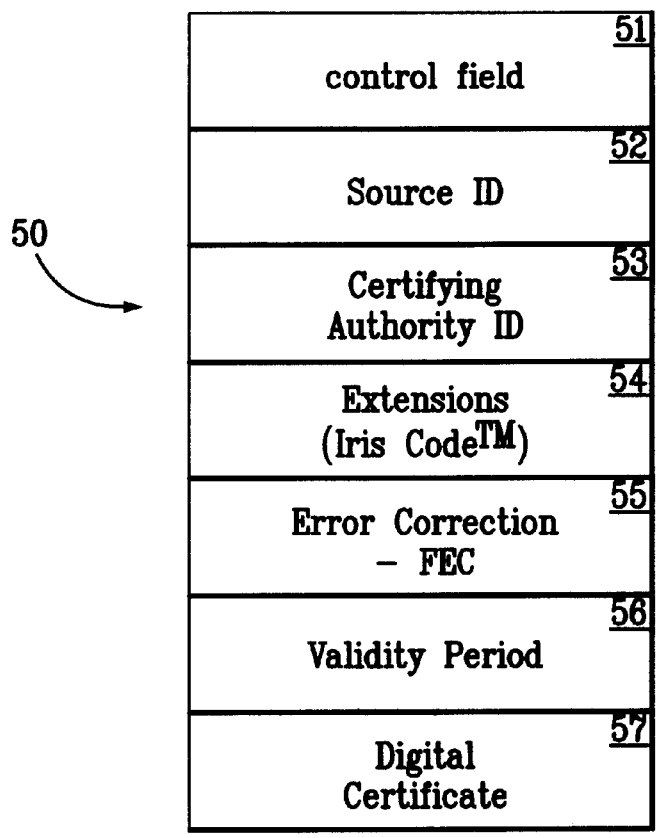
FIG. 2 is a schematic diagram of an exemplary iris certificate template including data relating to a digital certificate and an iris image.

FIG. 2 shows an exemplary combined template or code 50 that is communicated between an individual computing platform and the certifying authority. As shown, the code 50 (hereinafter also referred to as IrisCert™ code) includes a plurality or unique string of data fields having information associating a computing platform identification data and user identification information. Preferably, the exemplary IrisCert™ code 50 of the present invention comprises a bit sequence including at least an iris image template 54 in combination with (e.g., appended to) a digital certificate 57.

For example, the system of the present invention can cryptographically bind the IrisCode™ template with the digital certificate to form the IrisCert™ code. The IrisCert™ code can also include other data fields, for example, a control field 51, a source ID field 52, a certifying authority ID field 53, an error correction field 55, a validity period field 56, etc.

Figure 3:
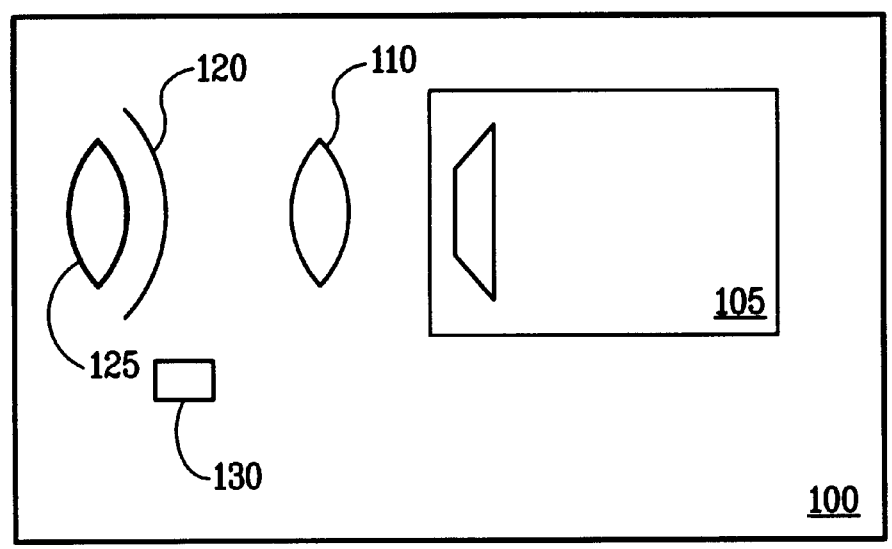
FIG. 3 is a schematic diagram of an exemplary iris imager that can be used with the present invention.

FIG. 3 illustrates an exemplary embodiment of a handheld imager 100 that can be used with the present invention, such as the handheld iris imaging device described in patent application Ser. No. 09/200,214, "Handheld Iris Imaging Apparatus and Method", filed on Nov. 25, 1998, which is incorporated herein by reference. The exemplary handheld, non-invasive, non-contacting iris imager includes an iris acquisition device 105, an imaging lens 110, a mirror 120, an optional diopter correction lens 125, and an illuminator 130. The imager 100 can be powered by a standard DC or AC power supply, and preferably a 9-volt battery (not shown).

The iris acquisition device 105 is preferably a conventional solid state video camera, such as a charged coupled device (CCD) or complementary metal oxide semiconductor (CMOS) device. A preferred camera is a ⅓ inch format, monochrome CCD board camera, such as Computar Model EM200. Preferably, the video camera 105 is sensitive to light of wavelengths in the range of about 400 nanometers to about 1100 nanometers, and is positioned so that its front surface coincides with the image plane of the lens 110 in front of it. In the preferred embodiment, the object plane of the lens is approximately 89 mm in front of the lens 110. More preferably, the lens 110 is an optical lens with approximately 14.2 mm focal length.

The mirror 120, preferably a concave cold mirror having a radius of curvature preferably about 276 mm, is disposed on the side of the lens 110 opposite the video camera 105 and creates a magnified virtual image of the iris behind the mirror 120. In the preferred embodiment, the mirror 120 reflects visible light with wavelengths in the range of about 400 to about 700 nanometers, and passes light having longer wavelengths, such as those in the range of about 700 to about 900 nanometers.

The illuminator 130 is positioned just outside the edge of the cold mirror 120 and is used to illuminate the iris of the subject being identified. The preferred illuminator 130 emits light having wavelengths of about 680 to about 900 nanometers. Preferably, the illuminator 130 is a miniature quartz halogen or krypton gas bulb operating at approximately 1 watt.

The imager acquires images of an iris with sufficient clarity, focus, and size for use with the image processing and comparison routines. A preferred image processing and comparison routine is described in U.S. Pat. No. 5,291,560, "Biometric Personal Identification System Based on Iris Analysis", issued to Daugman, and commonly assigned with the present invention to IriScan Inc., of Marlton, N.J., and incorporated herein by reference. However, any processing and comparison technique can be used with the image that is acquired at the imager, such as the image pixel correlation technique described in U.S. Pat. No. 5,572,596, "Automated, Non-Invasive Iris Recognition System and Method", issued to Wildes et al. and the techniques described in U.S. Pat. No. 4,641,349, "Iris Recognition System", issued to Flom et al., both of which are incorporated herein by reference.

FIG. 4A shows the apparatus of FIG. 3 in greater detail. The lens 110 gives a high resolution image of the eye 150 of the user, who is positioned in front of the lens 110, so that extreme proximity between the eye 150 and the imager 100 is not required (e.g., no contact is needed between the subject and the imager 100).

The handheld iris imager comprises a solid-state image capture device and an optical system which forms an image 109 of the iris on the image capture device at the image plane of the video camera 105 and at the same time produces a virtual image 115 of the iris which the user can use to position and focus the iris image. As a result, the user can, using the same eye being imaged, see a reflected image of the iris which can be used to position the handheld imager 100 so that a good iris image (e.g., an image that can be processed and compared to those stored in a database) can be obtained.

FIG. 4A also shows an optional dioptric correction lens 125 positioned between the eye 150 and the cold mirror 120. The dioptric correction lens 125 is an adjustable optical element which corrects for the close-range focusing ability of the individual eye, which varies from subject to subject. When the lens 125 is properly adjusted, the magnified, reflected virtual image 115 of the subject's eye appears in sharp focus to the subject at the same eye-to-mirror distance at which the subject's eye is sharply focused on the front surface of the camera. This simplifies use of the imager, because the subject simply positions the image so that the virtual image 115 of the iris appears sharply focused.

A preferred embodiment of the dioptric correction mechanism has no correction lens 125 and instead has a mechanical means (not shown) for adjusting the position of the cold mirror 120 relative to the camera lens 110. This allows the user to vary the object distance of the cold mirror 120, thus changing the eye-to-lens distance at which the virtual image 115 of the iris is sharply focused. An alternative mechanical means (not shown) allows the position of the lens 110 to be adjusted so that the camera object plane coincides with the mirror object plane.

The ability to set the dioptric correction mechanism to accommodate a particular user has a great utility if the imager is used by only one person most of the time. Once the correction is set, the user can easily position the device to obtain a sharply focused reflected image. This automatically produces a sharply focused image from the camera and substantially immediate acceptance of the image by the focus assessment processor described below. Image capture time is thereby reduced and overall convenience and utility are enhanced.

An eye 150 is positioned in front of the imager 100 (e.g., about 3.5 inches in front), as shown in FIG. 4A, and the illuminator 130 is turned on. This, in turn, illuminates the eye 150 and the iris therein. Preferably, the light having wavelengths of about 400 to about 700 nanometers is reflected by the cold mirror 120, thereby forming a magnified virtual image 115 behind the mirror 120 which the user can see through the eye being imaged. The radius of curvature of the mirror is selected so that the magnified image 115 of the eye substantially fills the user's entire field of view. Hence, when the imager 100 is positioned so that the entire eye 150 is visible, it is virtually assured that the eye 150 will be substantially centered in the object plane 140 of the camera 105. Under these conditions, the light having wavelengths of about 700 to about 900 nanometers is passed by the mirror 120 and forms an approximately centered image 109 of the eye 150 at the image plane 107 of the camera 105. The image is then captured and processed, as described below.

Although a cold mirror (one which reflects shorter wavelengths and passes longer wavelengths) is described herein, it is understood that a hot mirror (one which reflects longer wavelengths and passes shorter wavelengths) could also be used in accordance with the present invention. Such a configuration is shown in an imager 101 in FIG. 4B. The eye 150 is illuminated by an illuminator 131 emitting light having wavelengths in the range of about 680 to 900 nanometers. This light is reflected by the eye 150 and the light having wavelengths in the range of about 700 to 900 nanometers is reflected by the hot mirror 121 to be focused by the lens 111 onto the front surface of the camera 106. Light reflected from the eye 150 having shorter (visible) wavelengths in the range of about 400 to 700 nanometers passes through the hot mirror 121 and strikes a concave broadband mirror 122 which reflects light having wavelength from about 400 to 900 nanometers. This light forms a virtual image 115 of the eye 150 behind the concave mirror 122 that the user can see and use to align and focus the device, as described below.

FIG. 5 is an exemplary flow diagram showing an exemplary enrollment process and setup for the fast biometric database system of the present invention using digital certificates. A certifying authority (CA) and identity server is established at step 800. Exemplary certifying authorities that can be used with the present invention include Entrust, Cybertrust, Verisign, Baltimore Tech, etc. The certifying authority is the matching agent in the system and uses a predetermined protocol to decrypt and authenticate the communicated IrisCert™ code from individual computing platforms. Preferably, the system is established having a predetermined hierarchy or protocol, such as different classes of certificates, for the assignment and evaluation of certificates.

The certifying authority and identity server establishes and maintains a central database at step 805. The database can be separated into a master database and a plurality of partitions ($P_1$, $P_2$, $P_3$, $P_4$, ... $P_n$) at step 810. The database is partitioned according to the digital certificates attached to each computing platform and each partition contains stored biometric templates for individuals enrolled in that application and authorized to use that particular computing platform. In addition, other identity information such as the name of the person enrolled, the biometric feature enrolled, an authorized level of access, entitlements, etc. can be stored in the database partition.

A plurality of computing platforms for a particular application are enrolled with and connected to the certifying authority and identity server at step 815. The computing platforms can be connected to the central database via any suitable wired or wireless connection. The certifying authority assigns a digital certificate which is attached to each of the plurality of computing platforms at step 820 and stores information regarding the assigned digital certificate and the computing platform in the database at step 825. The digital certificate can be unique to each computing platform, or alternatively, the same digital certificate or related digital certificates can be assigned to one or more computing platforms based on a feature or characteristic of the computing platform, such as geographical location, function, etc.

A plurality of individuals are enrolled at step 830 by obtaining a biometric image from the individual. The certifying authority and identity server designates which computing platform or platform each individual will have authority to access and what that level of access will be at step 835. Computing platform access and identification information relating to each individual is stored in the central database in the correct partition based on the digital certificate at step 840. Preferably, the system stores the information using a vertical storage type enterprise. This identity information includes one or more biometric image and can include other identification data, such as name, age, which computing platform or platforms each individual requires access to, security level, entitlements, etc. The biometric images are stored in the database in the partition that is pointed to by the digital certificate for each authorized computing platform for each individual.

Figure 6:
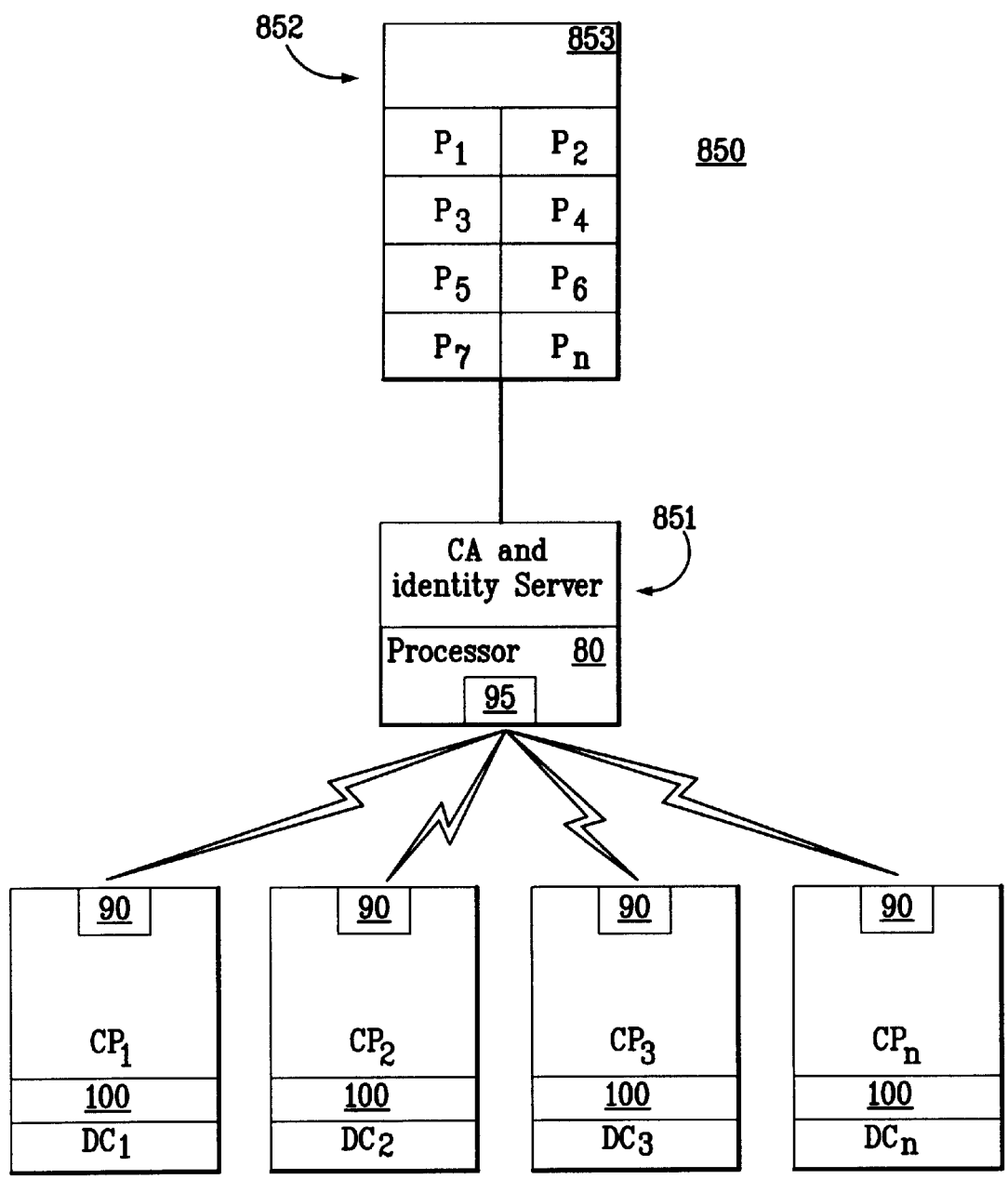
FIG. 6 is a schematic diagram of another exemplary system in accordance with the present invention.

As shown in FIG. 6, the computing platforms CP can be linked to the certifying authority and identity server 851 via wireless means, such as an RF modem 90 residing within the imager 100 communicating with a companion modem 95 on a processor 80 in the certifying authority and identity server 851, or elsewhere within in the certifying authority and identity server 851. This increases the flexibility of the computing platforms CP for certain applications where the limited range of motion imposed by a wired connection would limit its usefulness. These might include, for example, certain applications such as portable computers and laptop type computers where it is not desirable or convenient to require that the computing station remain stationary at a fixed location. The modem 90 can also receive instructions from the certifying authority and identity server, such as to activate the computing platform, to activate one or more applications at the computing platform, or activate visible and/or audible indicators (described below with respect to FIG. 9).

Figure 7:
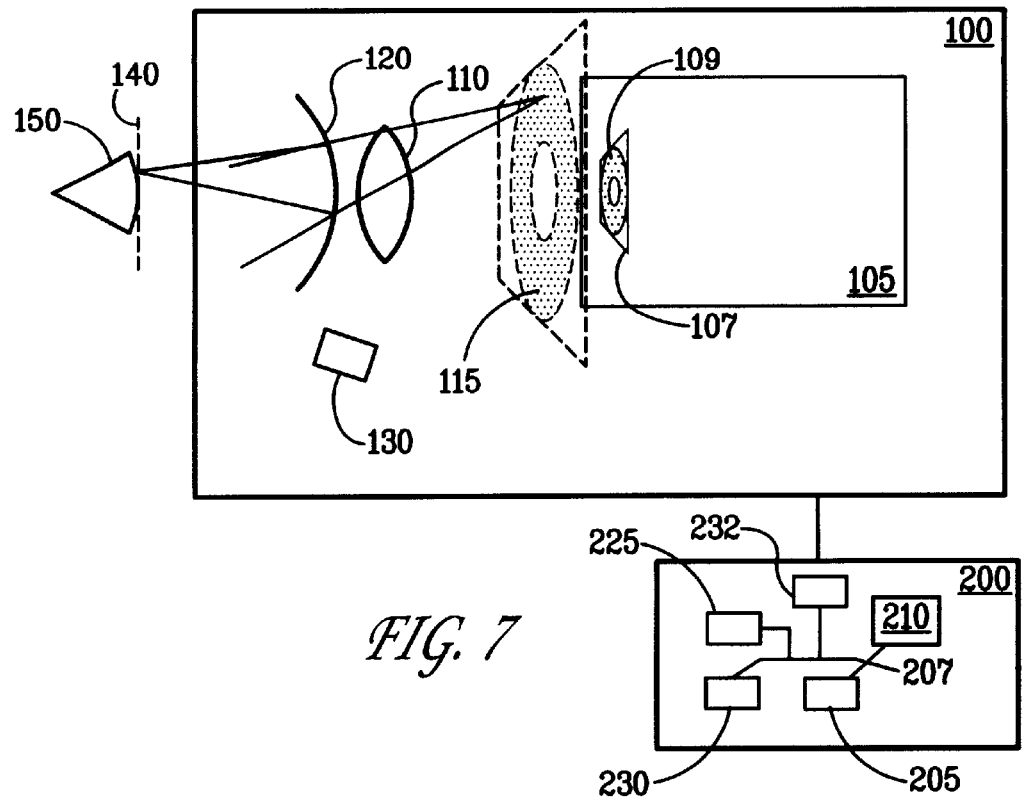
FIG. 7 is a schematic diagram of an exemplary iris image recognition system that can be used with the present invention.

FIG. 7 is a schematic diagram of an exemplary iris image recognition system to be used with the present invention. The imager 100 is coupled to a microprocessor 210 that performs the processing and comparison. As shown, the microprocessor 210 can reside in a conventional computer 200, such as a standard personal computer, which can comprise the computing platform (e.g., 100 MHZ, 32 Mbyte DRAM, monitor, keyboard, ports, hard drive, floppy drive, CD-ROM drive). Alternatively, the microprocessor 210 can reside within the imager 100, such as an IrisEngine™ processor manufactured by IriScan Inc., Marlton, N.J.

The microprocessor 210 is coupled to the imager 100 via conventional cables and/or printed circuit boards (PCBs) that are connected into slots on the computer, such as an ISA slot or a PCI slot. Other conventional means for coupling the imager 100 and the microprocessor 210 can be employed. The microprocessor 210 controls the imager 100 and runs software held in read only memory (ROM) 205. The processor 210 is connected via a bus 207 to the ROM 205, a random access memory (RAM) 232, another memory such as an erasable programmable ROM (EPROM) 230, and an input/output (I/O) controller 225. The RAM 232 is large enough to hold at least one captured image of an iris. The I/O controller 225 is connected to the appropriate circuitry and drivers (not shown) for issuing commands to control the imager 100.

The imager 100 preferably transmits the images in RS170 format to a frame grabber PCB, such as the PixLink VGX2MB frame grabber PCB, for image processing; or provides the digital images directly to the processing unit 210. "On/off" data is transmitted from the imager 100 to the processor 210 to initiate the image acquisition function. A digital image could be provided if a digital camera is used. Preferably, for an analog video camera, data is analog RS170 from the camera 105 to the frame grabber PCB, or digital from a digital camera to the microprocessor 210, and digital for all other functions.

The image processing includes a number of image processing steps (such as those described in U.S. Pat. Nos. 5,291,560 and 5,572,596, which are herein incorporated by reference) which lead to extraction of a unique and highly specific digital biometric template that can be used to identify the individual based on intensity patterns within the iris. The biometric template is then compared against other templates or images stored in a memory (such as a RAM or EPROM) 230 within the computer 200, or central database (not shown). The memory 230 stores selected data representing images of the iris of a plurality of subjects. Preferably the identification information is stored and organized within the central database using a vertical storage type enterprise. A match of the biometric template with a template stored in the memory 230 identifies the subject whose iris is being imaged.

Alternatively, the imager 100 can be linked to the microprocessor 210 via wireless means (not shown), such as an RF modem residing within the imager communicating with a companion modem on the microprocessor or elsewhere within in the computer. This increases the flexibility of the imager for certain applications where the limited range of motion imposed by a wired connection would limit its usefulness.

Figure 8:
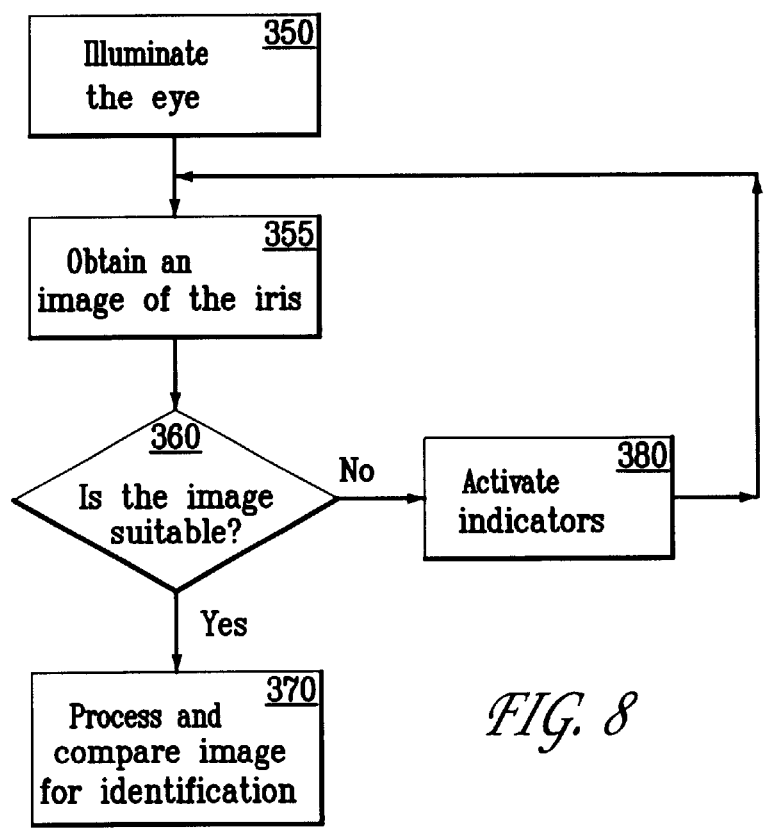
FIG. 8 is a flowchart of a method of obtaining a biometric image to be used with the present invention.

FIG. 8 is a flowchart of a method of operation for obtaining a suitable biometric image, such as the iris image, to be used with the present invention. The method is used for the enrollment, as described herein with respect to FIG. 5, and the identification of an individual. The eye is illuminated at step 350 and an image of the iris is obtained at step 355. At step 360, it is determined if the image is suitable for use with the image processing and comparison routines. If the image is suitable, the image is passed to the processor for further processing and comparison, at step 370. The system processes the image and compares it to stored images (or templates) to identify the iris, and thus, the user. In accordance with one embodiment of the present invention, image processing algorithms are used to extract a fixed length template (e.g., about 512 bytes long) from each iris image. Iris images are compared by determining the percentage of bits in each template that match. If the percentage of bits that match exceeds a predetermined threshold (e.g., about 75%), then it is determined that the iris images being compared belong to the same iris, thereby identifying the subject being tested. If the image is not suitable, at step 380, the indicator (s) is activated (e.g., a beep sound is issued), and processing continues at step 355 (e.g., another image is obtained).

Figure 9:
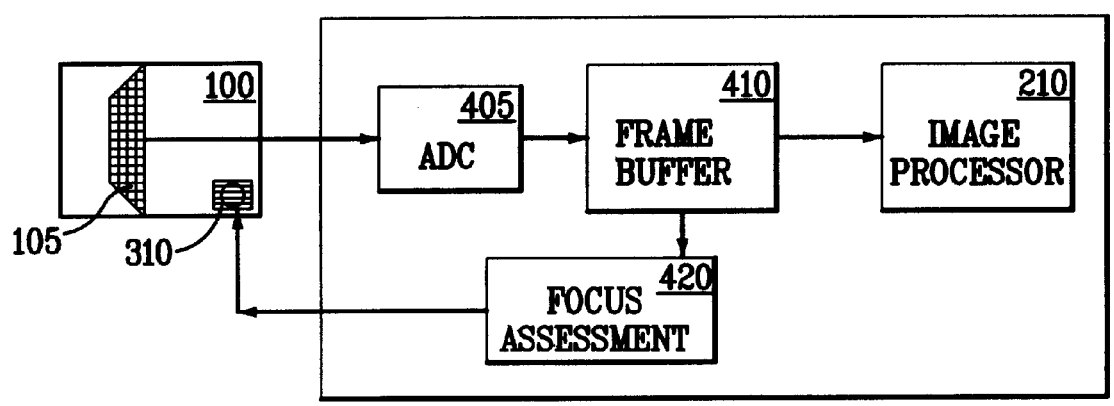
FIG. 9 is a schematic diagram of an exemplary iris image recognition system having a focus assessment processor that can be used with the present invention.

Because the eye's own focusing system automatically adjusts to bring the virtual image 115 into sharp focus to the user, it cannot be relied upon to always accurately focus the eye image on the camera 105. For this purpose, an external focus assessment system is used in one embodiment, as shown in FIG. 9. Video image information from the handheld imaging device 100 is received as an analog video signal which conforms to a standard format such as NTSC or PAL. In these formats video frames are transmitted at a rate of 25 (PAL) or 30 (NTSC) frames per second. The analog image data is transmitted to an analog-to-digital converter 405 and stored in a frame buffer memory 410, such as a RAM similar to RAM 232 described above with respect to FIG. 7, and capable of storing one complete frame of digitized video information. A focus assessment processor 420 accesses the digitized image information and applies certain measurement algorithms which are disclosed in co-pending application entitled "Video-Rate Focus Assessment", Serial No. 60/109,960, filed Nov. 25, 1998, and incorporated herein by reference. The output of the focus assessment is used to control an indicator, such as the audible indicator 310. As long as the focus assessment processor 420 determines that the captured image is not acceptable for further processing and comparison, the audible indicator 310 is directed to emit periodic sounds to alert the user. Images are repeatedly acquired and assessed until an acceptable one is received. After an acceptable iris image has been received, the audible indicator 310 is turned off and the final image is retained for further processing and comparison, for example, by the microprocessor 210, as described above.

Any known technique for image focusing can be used with the imager of the present invention, such as those described in U.S. Pat. No. 4,876,608, entitled "Focus and Signal to Noise Measurement Routines in Input Scanners", issued to Eaton, U.S. Pat. No. 5,151,583, entitled "Focus Adjustment Device Having Restricting Means for Restricting a Selecting Action According to the Degree of Nearness of a Distance Measurement", issued to Tokunaga et al., and U.S. Pat. No. 5,404,163, entitled "In-Focus Detection Method and Method and Apparatus Using the Same for Non Contact Displacement Measurement", issued to Kubo. The preferred system and method for focus assessment are described below.

Figure 10:
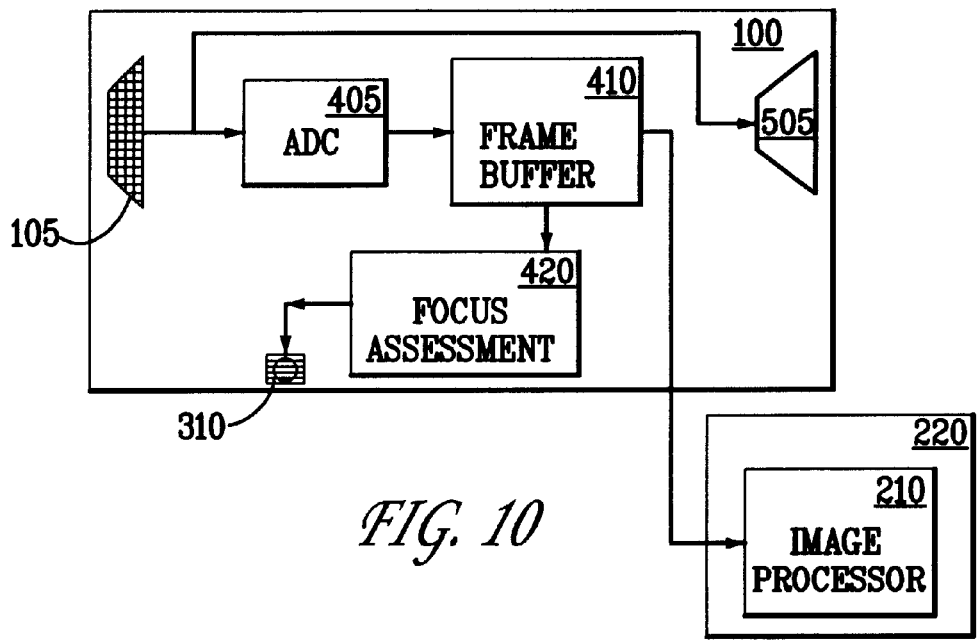
FIG. 10 is a schematic diagram of an exemplary iris imager comprising a focus assessment processor that can be used with the present invention.

The focus assessment can be performed by the microprocessor 210 in the computer 200, or it can be a separate processor element. For example, the focus assessment processor 420 can be disposed within the handheld imager 100, as shown in FIG. 10, and not be external to the imager 100, as shown in FIG. 9. A benefit of this embodiment is that the selection of a properly focused image can occur within the hand-held device, so that only a single, acceptable image is transmitted to the external processor 210. In the embodiment shown in FIG. 11, the focus assessment algorithm is typically performed within a personal computer, so digitized image data is transmitted to the personal computer at video rates. However, the high data rates associated with transmission of digitized video cannot be supported by some types of computers, particularly notebook-style personal computers. If the focus assessment is performed in the handheld device 100, the single selected video frame can then be transmitted at a lower data rate which is compatible with notebook-style personal computers. This greatly enhances the flexibility and versatility of the handheld imaging device of the present invention.

As shown in FIG. 10, the video signal (analog) from the camera 105 is converted to digital format by an analog-to-digital converter 405 and each frame of video is stored in a frame buffer memory 410. The converter 405 and memory 410 are similar to those described above with respect to FIG. 9, but are disposed within the handheld imager 100. Data in the frame buffer 410 is processed by a focus assessment processor 420 which is also contained within the handheld imager 100. The results of the focus assessment control an audible indicator 310 which emits a sound that is discontinued when an acceptable video frame is acquired. The single video frame that has been determined to be acceptable is transmitted to another processor 210 (typically within a personal computer 200) for further processing and comparison.

It is contemplated that in addition to the focus assessment processor, an auto-focus lens system could be used in the present invention. The results of the focus assessment control the lens system, thereby automatically adjusting focus to produce an optimal image. This would place less of a premium on the accuracy with which the user positions the eye, and would be helpful if the user could not see or hear the indicators described above.

Optionally, the imager of the present invention can be equipped with a display, such as a miniaturized backilluminated liquid crystal display (LCD) 505. The LCD display 505 is disposed on the side of the imaging system opposite the subject whose eye is being imaged. The video signal generated by the camera 105 is continuously displayed on the LCD display 505 to permit an operator (other than the subject whose eye is being imaged) to control the position of the hand-held imaging device 100 and thereby center the eye's image in the field of view to more easily achieve proper focus, as indicated by the sound emitted by the audible indicator 310. This allows the device to be used on individuals who are unable or unwilling to cooperate in the image acquisition process. Thus, in accordance with the present invention, either a user can scan his own iris (e.g., for entry to a building) or a user can scan another subject's iris (e.g., for identification).

Figure 11:
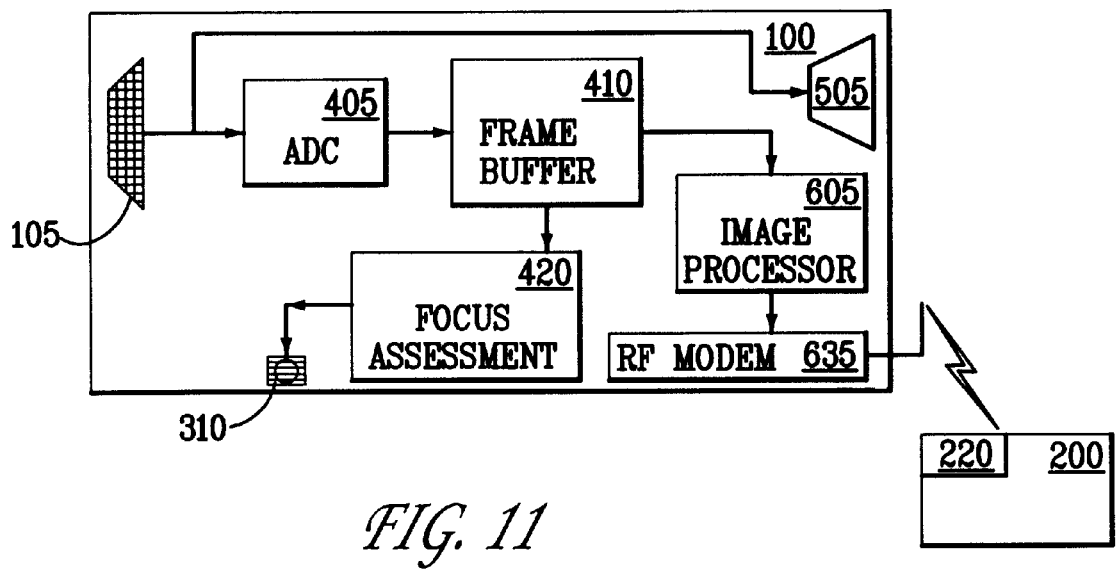
FIG. 11 is a schematic diagram of an exemplary iris imager comprising a focus assessment processor and image processor that can be used with the present invention.

An additional embodiment of the present invention is shown in FIG. 11. In FIG. 11, an additional processor 605 has been added to the device of FIG. 10. The additional processor 605 extracts the iris image data, processes it to produce a biometric template, and encrypts it so that the output of the handheld imager 100 is an encrypted biometric template that can be used by the processor 210 in the computer 200 for comparison. Alternatively, the encryption and processing can take place in the computer 200, a local sever, or a central database.

Encryption can be with any of the known encryption techniques, such as, for example, using public and private keys to encipher and decipher the data, respectively. Preferably, where public and private keys are used, one public key is assigned to each computing platform or node on a LAN type system. Alternatively, one or more computing platforms within, for example the same department and serving the same function may share the same public key. One advantage offered by this embodiment of the imager is that the added functionality required to add the biometric identification technology to a computer system is contained within the handheld imager 100, thereby simplifying installation, support, and service. Secondly, the security of transactions which utilize the IrisCert™ code is enhanced because the data is generated and encrypted totally external to the computer 200 and thus is less susceptible to theft, alteration, or interception.

In the embodiment of FIG. 11 a wireless modem 635 is shown. The encrypted biometric template from the processor 605 is transmitted via the modem 635 to one of the computer 200 a local server, and a central database for further processing and comparison. The modem 635 also receives instructions from one of the computer 200, a local server, and a central database, such as to activate visible and/or audible indicators.

Most biometric technologies are useful only for verification, implying 1:1 matching between a live biometric measurement and a single stored template. However, some biometric technologies, such as the iris recognition technology described herein, are capable of identification, in which the live biometric is matched against N entries in a database to identify an individual without the need to provide a presumed identity or biometric token. This 1:N match can be performed for very large N due to the extremely low single-match false accept rate (FAR) and false reject rate (FRR) which characterize iris recognition technology, such as the IriScan® technology.

The exemplary iris recognition technology, as described above, is based on computer image processing techniques which distill the extremely complex and varied patterns of furrows, striations, crypts, etc. of the iris into a compact digital code (e.g., a 512-bytes), hereinafter also referred to as a template or an IrisCode™ template.

When an individual is enrolled in the database, for example using the exemplary enrollment process of FIG. 5, a template, for example a 512-byte template, is added to an array of such codes, and suitable pointers can be generated to associate the template with that person's other identification information, such as name, ID number, age, gender, clearance level, access authorization, etc., in the same or a separate database. The 512-byte template represents an exemplary iris template stored in the database. This exemplary template can include, for example, 256-bytes of information relating to the iris image and 256-bytes of control information.

When the individual presents his or her iris for authentication and thus identification, the iris image is processed and a "long" template (e.g., IrisCode™ template), for example, a 1024-byte template is generated. This "long" template includes extra information to accommodate possible relative rotations between the iris images collected at enrollment and authentication. The matching process includes comparing the long template with each and every stored (512-byte) template in the database, performing an "exclusive or" operation between the two templates, and determining the fraction of total bits which are different between the two templates.

The present invention provides an approach to large database searching for identification of an individual that avoids the problems associated with combining multiple processors by using digital certificates to authenticate the computing platform and to point to a partition of a large database. In many identification applications, individuals seeking to be identified typically do so from the same network node, or perhaps one of a small number of nodes (hereinafter also referred to as computing platforms). The system and method of the present invention structures the biometric identification system with a single central database containing all biometric templates (e.g., IrisCode™ templates) associated with a particular identification application and enrolled in the database, such as the iris identification system with a single central server containing all IrisCode™ templates for that application.

Some exemplary applications that can use the large database search methodology of the present invention include health care networks, manufacturing businesses, insurance companies, banking networks, ATM machines, kiosks, etc.

Figure 12:
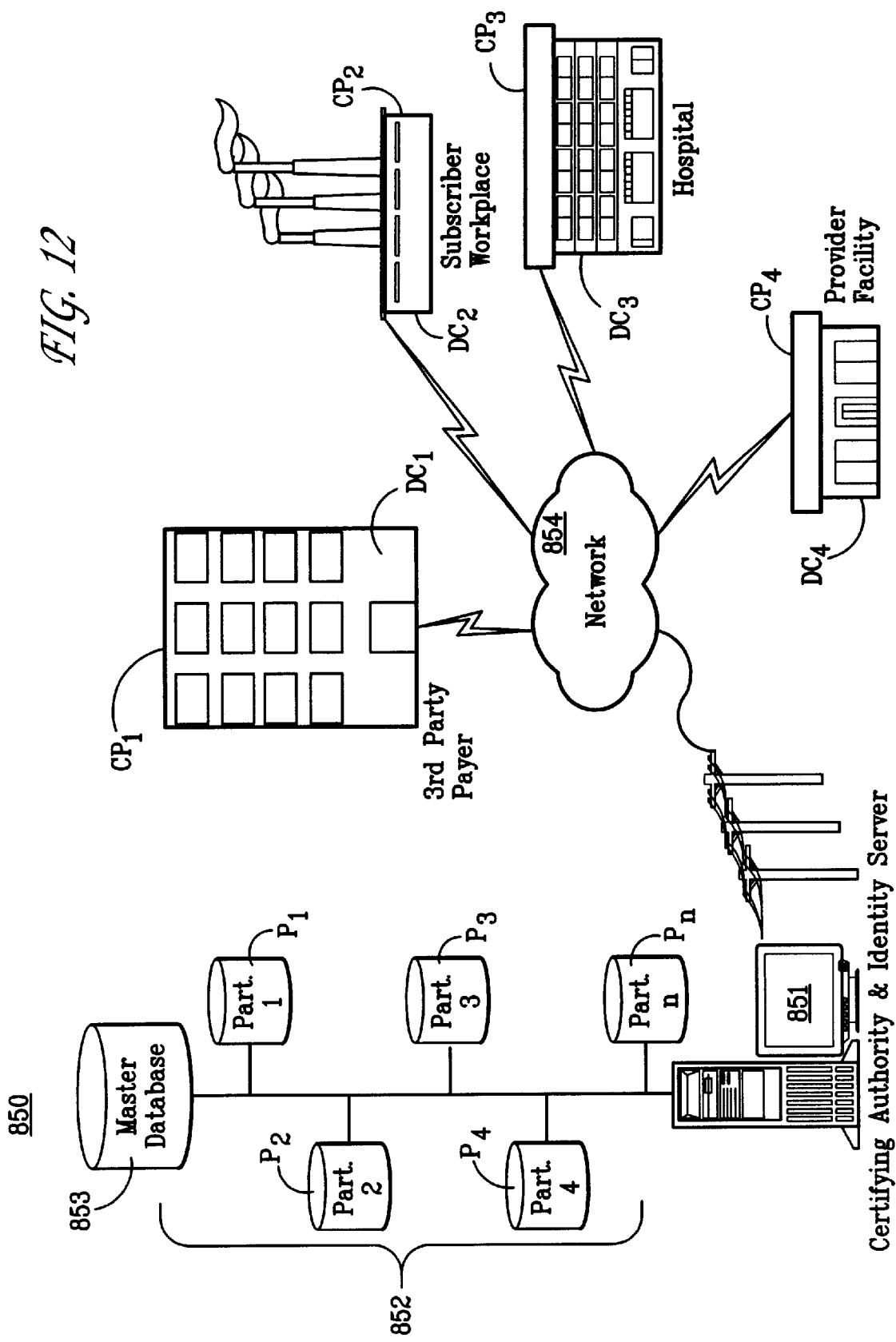
FIG. 12 is a block diagram showing an exemplary system in accordance with the present invention.

FIG. 12 is a block diagram showing an exemplary system of the present invention for an identification network for use with, for example, a health maintenance organization. The exemplary system provides a methodology for fast biometric database searching that allows a computing platform to be authenticated using digital certificates and allows an individual to be identified using digital certificates and one or more biometric images associated with the individual. As shown in FIG. 12, the system 850 includes a certifying authority and identity server 851, a database 852, a heterogeneous plurality of computing platforms ($CP_1$, $CP_2$, $CP_3$, $CP_4$, . . . $CP_n$) connected to the database 852 through the certifying authority and identity server 851, a digital certificate ($DC_1$, $DC_2$, $DC_3$, $DC_4$). . . $DC_n$) attached to each of the computing platforms CPs, and a biometric imager, such as that described with respect to FIG. 7, for obtaining one or more biometric images of an individual for identification of the individual.

The database 852 can be separated into a master database 853 and a plurality of partitions ($P_1$, $P_2$, $P_3$, $P_4$, . . . $P_n$) that are keyed to the digital certificates DCs. The database 852 includes a plurality of stored digital certificates of computing platforms that are enrolled in the system 850 and that correspond to the attached digital certificates and a plurality of stored biometric images of individuals who are enrolled in the system.

As shown in FIG. 12, the plurality of computing platforms CPs can include remote users seeking access to the central database 852 and hence the information stored in the database 852. These remote users can include any persons seeking access, including a third party payer $CP_1$, a subscriber workplace $CP_2$, a hospital $CP_3$, a provider facility $CP_4$, etc. $CP_n$. The computing platforms, or network nodes, can be grouped together according to geographical location and/or function, and can be given a common group identity, the intent being that most of the time people seeking to be identified will do so from a node within one identity group. In addition, database partitions associated with digital certificates that authenticate platforms that have been combined can also be combined. This allows individuals using any of these grouped platforms to be identified.

Each of the computing platforms CPs is connected to the database 852 via a standard connection technique, such as a wired or a wireless connection. For example, each computing platform can include a personal computer connected to a local or an area network 854 via a server 855, and the network can be connected via a modem to telephone lines to the certifying authority and identity server 851.

In addition, an activation device (not shown), such as a continuous recognition function, a pushbutton, a motion detector, a photoelectric eye, etc., can be provided at each computing platform for initiating the identification process. An input device (not shown), such as a keyboard and mouse, can be provided at each computing platform for inputting commands and other identification information about the individual and for responding to inquiries from the certifying authority. A communications device, such as a transmitter/receiver device (not shown), can be provided at each computing platform CP and at the certifying authority and identity server 851 to facilitate the exchange of information between the computing platform CP and the certifying authority and identity server 851.

Preferably, the system includes a feedback mechanism for communicating information between the certifying authority and identity server and one of the computing platforms. This information can include, for example, access keys for accessing the computing platform and the database, a level of authorization, entitlements, etc.

When an iris is presented for identification, it is combined with the digital certificate to form a combined template (e.g., IrisCert™ code) which is transmitted to the certificate authority (CA). If the certificate is authenticated, it can be used as a pointer into a large database of certificates. The combined certificate would be decomposed into its logical and functional elements; one of which would be the IrisCode™ template imbedded or attached to the certificate template. The certificate, as a pointer, would allow the database to be parsed or separated into sections depending on whose IrisCode™ templates were enrolled with entitlements to use that computing platform. In other words, the authenticated certificate points to a subset of people, their biometric template (e.g., IrisCode™ templates), the functions that they are authorized to perform, etc.

This narrows the database search to only those individuals who have authorized access to a particular computing platform by using digital certificates in conjunction with iris recognition. This allows authenticated access to be limited to those who have enrolled their irises (or other biometric characteristic) and who are authorized via the certifying authority to use that computing platform.

The present invention allows the system to avoid having to search an entire database of, for example 10M entries, because the IrisCode™ template is stored on the certificate. The certificate allows for the secure partitioning of the database which narrows the search. For example, assume two people work at Cardinal Health, one as a nurse in a doctor's office in Ohio and the other as a neurosurgeon in a hospital in Illinois. The nurse would have his or her IrisCode template registered/enrolled at every platform that the nurse uses in the office. The use of the office computer(s) is managed based on the correct identification of the nurse and the almost unchanging nature of the computing/certificates. Likewise, the neurosurgeon may use a computer in the hospital, the office computer in his or her office, the computer at the nurse's station in the neurosurgery ward, and the computer by the operating room. The search for either the nurse's or the neurosurgeon's identity is therefore restricted to the certificate partition based on the computer(s) that each one is authorized to use.

Figure 13:
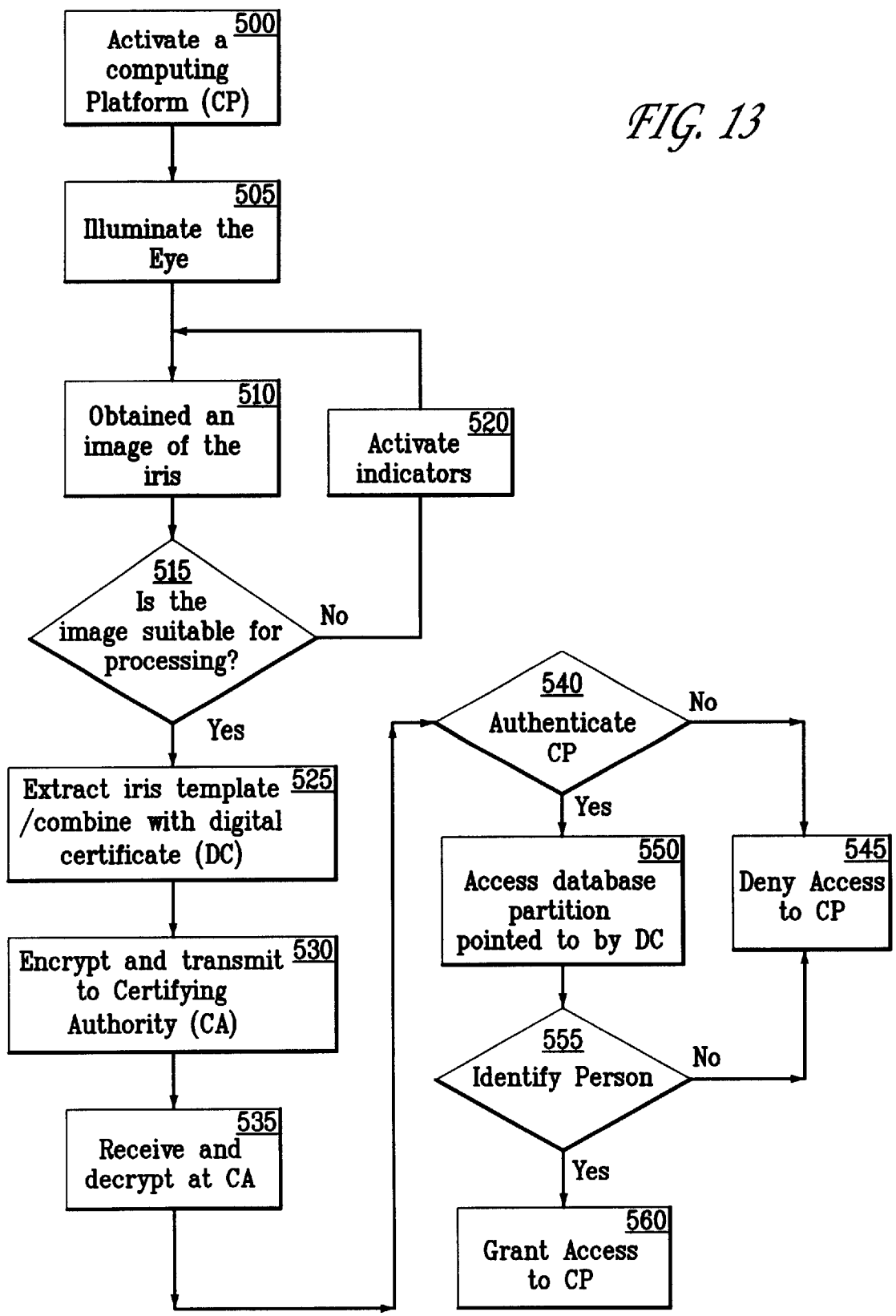
FIG. 13 is a flowchart of a method of operation in accordance with the present invention.

FIG. 13 shows an exemplary flowchart for the identification of an individual at a computing platform in accordance with the present invention. As shown in FIG. 13, the system is activated by an unknown individual seeking access to use the computing platform at step 500. The eye, and therefore the iris, of the individual is illuminated at step 505 and an image of the iris is obtained at step 510. At step 515 it is determined whether the image is suitable for use with the image processing and comparison routines. If the image is not suitable, at step 515, an indicator(s) can be activated (e.g., a beep sound is issued), and processing continues at step 510 (e.g., another image is obtained).

If the image is suitable, the image is passed to a processor for further processing, at step 525. At step 525, the iris template is extracted and combined with the digital certificate to form a combined template (e.g., IrisCert™ code). This combined information can be encrypted and is transmitted to the certifying authority and identity server at step 530. The certifying authority and identity server receives and can decrypt the information from the computing platform at step 535. A comparison is performed of the received digital certificate to the stored digital certificates at step 540. If the received digital certificate does not match a stored digital certificate, then the computing platform is not authenticated and access to the database is denied at step 545 and the identification process ends.

If the digital certificate is matched with one of the stored digital certificates, then the computing platform is authenticated, and access to the database is permitted at step 550. The authenticated digital certificate is used at step 550 as a pointer to point to one or more partitions within the database.

The designated database partition is accessed and the obtained biometric image is compared to the plurality of stored biometric images in the database partition at step 555. If the obtained biometric image does not match any of the stored biometric images, then the individual is not identified and access to use the computing platform is denied at step 545 and the identification process ends. If the obtained biometric image does match one of the stored biometric images, then the individual is identified and access to the computing platform is granted at step 560.

The database can contain, or alternatively can point to, another database or databases having additional information such as information relating to the identity of the individual, the authorized level of access, other entitlements that the individual may have relative to the particular computing platform accessed, etc.

The identification of individuals at the computing platform is authenticated using biometric information (something you are) and digital certificates (where you are). Because the iris of the eye is fundamentally the "true" identity of the individual, the combination of the identification characteristics of iris recognition and the security of digital certificates provides substantial benefits.

An iris-based authentication and identification system of the present invention is a mechanism which binds the iris of individuals to the digital certificate. This system authenticates a computing platform and the identity of a user at the computing platform and includes a certifying authority, computing platforms, an iris image capture system (enrollment and recognition), and the associated necessary security components (e.g., digital certificates). The system can include an iris extractor, which responds to the digital iris certificate to isolate the iris from the certificate and a classifier which, responds to the first IrisCode™ template of the live iris and the second IrisCode™ template from the enrolled iris. The classifier compares the two irises and generates an authentication decision signal corresponding to accurate acceptance of or rejection of identity.

The combination of cryptographic techniques, such as public key cryptography, and digital certificates provides greater integrity, privacy, and authentication for applications having multiple computing platforms connected to a central database. The authentication of the computing platform using digital certificates as well as encryption techniques instills a greater level of confidence in the computing platform user, such as employees and electronic services consumers. Since digital certificates alone only authenticate the computing platform (e.g., the private key used in the transaction) and since private keys are physically stored on computers, such private keys are not physically related to the identity of the entities associated with the private keys (e.g., the identity of the individual at the computing platform).

A digital certificate, as well as the public and private key pair use for encryption, has no inherent association with any identity or computing platform, it is simply a code or pair of numbers. In order for digital certificates, as well as public key cryptography, to be successful, a trusted third party is needed that will bind an identity to a digital certificate, and a public and private key pair. The existence of such an entity will prevent an individual from generating a digital certificate or key pair and falsely claiming to be someone else. This entity is known, for example in the present invention, as a certification authority and identity server. A trusted certification authority assigns the digital certificate, an electronic document that binds the identity of a computing station to a digital certificate (or the identity of an individual to a public key). This digital certificate can be used as a form of electronic identification and authentication, like a digital passport, or used to secure electronic transactions conducted over the Internet or corporate intranet.

This computing platform to certificate authority authentication of the present invention can be accomplished using standard authentication techniques, such as the X.9 and X.509 certificate technologies. The inclusion of the biometric template (e.g., the IrisCode™ templates) in the transmitted template, allows the opportunity to authenticate an individual, such as a computing platform user, a company's employees, a consumer, etc., while using the certificate portion of the template both as the secure transport method and as the means to ensure privacy of the identity of the person and their IrisCode™ template.

The system and method of the present invention can be designed to automatically and dynamically reconfigure itself to accommodate staff mobility. Preferably, the architecture of the system is flexible. For example, the system would have the ability to deploy multiple, decentralized, registration authorities to support the issuance of certificates in support of the centralized certificate authority. In addition, the architecture of the system is preferably scalable. For example, multiple workplaces, hospitals, provider facilities, etc. could be added and database caches created as required.

This use of digital certificates as a pointer into the biometric database preserves the speed advantages of digital certificates while adding only marginal overhead and has substantial cost and processing advantages over other large database search mechanisms.

The database concept could be applied to applications requiring large central database searches, such as kiosks, ATM machines, etc. These types of identification nodes can be grouped geographically, taking advantage of the fact that people tend to use ATM machines or Point-of-Sales terminals within localized areas near home or work. Accordingly, since each ATM or POS has its own certificate, all the templates associated with those certificates from a given geographical area can be combined into one database partition to allow mobility of users within predetermined geographical areas. This approach offers the advantages of pre-classification without increased false reject rates. The system can be scaled upwards through the addition of more database partitions based on each computing platform or company's architecture. Moreover, the response time to a query decreases as partition size decreases and the number of processors increases.

Another embodiment within the scope of the present invention that provides flexibility and scalability to the system can be exemplified by the following. For example, if a customer attempts to use an ATM, POS, or other computing platform $CP_m$ which they have never used before and for which their template is not present in the associated database partition, they would be rejected. In this case, their template could then be matched against the entire master database. If a match is found, and their access privileges allow them to use platform $CP_m$, then their template could be downloaded from the master database to the database partition for $CP_m$, allowing them to be quickly authenticated the next time they use $CP_m$ or any other platform which is grouped in the same partition as $CP_m$. This amounts to dynamic reconfiguration of the database partitions to accommodate movement of individuals.

To prevent gradual expansion of database partitions over time, and associated degradation of search speed, each template could be stamped with the last date it was used to perform an authentication. Periodically the partitions could be purged, removing all templates that have not been used within some predefined period of time and are thereby judged to be inactive or obsolete.

Although illustrated and described herein with reference to certain specific embodiments, it will be understood by those skilled in the art that the invention is not limited to the embodiments specifically disclosed herein. Those skilled in the art also will appreciate that many other variations of the specific embodiments described herein are intended to be within the scope of the invention as defined by the following claims.

What is claimed is:

1. A system for biometric database searching for identification of a person at a computing platform comprising:
   a database having a plurality of stored biometric images, said database being separated into a plurality of partitions;
   a plurality of computing platforms coupled to said database;
   a digital certificate attached to each of said plurality of computing platforms and stored in said database to point to an associated one of said partitions;
   a biometric imager disposed at each of said plurality of computing platforms for obtaining a biometric image of said person; and
   a template comprising said digital certificate and said obtained biometric image, wherein an authentication of said computing platform and an identification of said person is based on a said template.

2. The system of claim 1 further comprising a certifying authority and identity server having a processor for authenticating said computing platform based on said digital certificate attached thereto and for identifying said person based on a comparison of said obtained biometric image to said plurality of said stored biometric images within said database partition pointed to by said digital certificate.

3. The system of claim 2 wherein said certifying authority is disposed between said computing platform and said database, wherein said certifying authority assigns each of said digital certificates to said computing platforms and controls access to said database based on a comparison of said digital certificate of said template to said stored digital certificates.

4. The system of claim 1 wherein said template comprises at least two digital fields.

5. The system of claim 4 wherein said at least two digital fields comprises one digital field including information relating to said digital certificate and one digital field including information relating to said biometric image.

6. The system of claim 1 wherein said template further comprises a third digital field, said third digital field including information relating to one of a person's identification, a computing platform authentication, a level of access, entitlements.

7. The system of claim 1 wherein said computing platform to said certifying authority authentication is accomplished using one of X.9 and X.509 technologies.

8. The system of claim 1 wherein said digital certificate further comprises a logical element and a functional element, one of which contains said obtained iris image imbedded or attached to said digital certificate.

9. The system of claim 1 wherein said plurality of computing platforms comprises two or more computing platforms that have one of a common and a related digital certificate attached thereto.

10. The system of claim 1 wherein said database is separated into said partitions based on at least one of: said persons whose biometric image is enrolled; said biometric traits that are enrolled; one or more level of accesses said person is entitled to; one or more entitlements to use said computing platform; a geographical location of said computing platform; and a function of said computing platform.

11. The system of claim 10 wherein said digital certificate contains a pointer to one or more partitions thereby narrowing a database search to said partition designated by said pointer and those persons who are authorized to access said computing platform.

12. The system of claim 1 wherein said database is a central database containing all biometric images associated with a particular identification application.

13. The system of claim 1 further comprising at least one communications device for communicating at least one of said digital certificate, said biometric image, and other identification information between said computing platform and said certifying authority.

14. The system of claim 13 wherein said at least one communications device further comprises a transmitter/receiver device disposed at said computing platform, a transmitter/receiver device disposed at said certifying authority, and one of a wired and wireless connection connecting said transmitter/receiver devices together.

15. The system of claim 1 further comprising an activation device for commencing said person identification and said computing platform authentication process.

16. The system of claim 1 further comprising a feedback mechanism coupled between said certifying authority and said computing platform for authorizing a level of access to said person to use said computing platform.

17. The system of claim 1 wherein each of said computing platforms further comprises:
   an input device;
   a memory for storing said digital certificate;
   a processor coupled to said imager and said memory for forming a template containing information regarding said digital certificate and said biometric image; and
   an output device adapted for transmitting said biometric template from said computing platform to said network.

18. The system of claim 17 wherein said processor further comprises one or more of private and public keys for encrypting said biometric template and said digital certificate template for security of transmission.

19. The system of claim 1 wherein said imager for obtaining a biometric image obtains an image of an iris of an eye, said imager comprising:
   an iris acquisition device having a front surface;
   a lens having an image plane disposed in front of said front surface of said iris acquisition device;
   a mirror disposed on a side of said lens opposite said iris acquisition device; and
   an illuminator disposed along a side of said mirror.

20. The system of claim 19 wherein said iris acquisition device comprises a camera, and said mirror is a cold mirror.

21. The system of claim 1 wherein said system is automatically and dynamically reconfigurable.

22. The system of claim 1 wherein said system is scalable to allow computing platforms to be added or removed and database partitions to be created or terminated.

23. A system for identification of a person at a remote computing platform and for authorizing said person a level of access to use said computing platform comprising:
   a plurality of computing platforms, each computing platform comprising:
      an input device for receiving input from said person;
      a biometric imaging device for obtaining a biometric image of said person;
      a display device for displaying one or more of said person input and said obtained biometric image;
      a processor for forming a template containing information regarding said computing platform and said obtained biometric image;
      a first communications device adapted for transmitting said template from said computing platform;

a digital certificate attached to each of said computing platforms;

a certifying authority coupled to each of said plurality of computing platforms, said certifying authority comprising:

a second communications device capable of communicating with said first communications device of each of said computing platforms;

a database having a plurality of stored biometric templates and being separated into a plurality of partitions, each partition being keyed to one of said digital certificates attached to each of said plurality of computing platforms;

a second processor for authenticating said computing platform based on said digital certificate and for comparing said obtained biometric image to said plurality of said stored biometric images within said database partition designated by said certificate to identify said person; and a feedback mechanism coupled between said certifying authority and said computing platform for authorizing a level of access to said person to use said computing platform.

24. The system of claim 23 wherein said imager for obtaining a biometric image obtains an image of an iris of an eye, said imager comprising:

an iris acquisition device having a front surface;

a lens having an image plane disposed in front of said front surface of said iris acquisition device;

a mirror disposed on a side of said lens opposite said iris acquisition device; and an illuminator disposed along a side of said mirror.

25. The system of claim 23, further comprising:

a first memory for storing at least one template comprising at least one image of an iris of at least one person's eye and at least one digital certificate;

a second memory for storing a template of an iris image previously obtained by said iris acquisition device and for storing a template of said digital certificates attached to said computing platforms; and a comparator for comparing said template of said digital certificate of said second memory with said at least one stored digital certificate template of said first memory to authenticate said computing platform and for comparing said biometric template of said iris image of said second memory with said at least one stored biometric template of said first memory to identify said person.

26. The system according to claim 25, wherein said comparator comprises a processor responsive to an output of said computing platform for comparing said template of said digital certificate and said template of said iris image of said second memory with said stored templates of said first memory.

27. In a system involving a transaction between a computing platform and a certifying authority having a central database, a computer-readable media being provided at one of said computing platform and said controlling authority having computer-executable instructions for performing the following steps:

assigning a digital certificate from said certifying authority, said digital certificate containing information pertaining to said computing platform, and said digital certificate being keyed to a partition in said database;

attaching said assigned digital certificate to said computing platform;

obtaining a biometric image of a user at said computing platform;

processing said attached digital certificate and said obtained biometric image to form a template, said template containing information relating to said digital certificate and said obtained biometric image;

transmitting said template from said computing platform to said certifying authority;

authenticating said computing platform by comparing said digital certificate to a plurality of stored digital certificates stored in said database;

accessing said database based on said step of authenticating;

searching a partition established within said database keyed to said digital certificate;

identifying said user by comparing said obtained biometric image to a plurality of stored biometric images stored in said partition of said database; and authorizing said user to use said computing platform based on said step of identifying.

28. A method of biometric database searching for identification of a person at a computing platform, said method comprising:

attaching a digital certificate to each of a plurality of computing platforms;

storing a copy of said attached digital certificates with a certifying authority and identity server initiating a transaction by said person at one of said plurality of computing platforms;

obtaining an image of a biometric trait of said person;

processing said obtained image and said digital certificate to form a template;

communicating said template to a certifying authority and identity server;

providing a database containing a plurality of stored images of persons authorized to use said computing platform and said stored digital certificates;

segregating said database into a plurality of partitions keyed to said digital certificates;

comparing said communicated digital certificate to said stored digital certificates;

authenticating said computing platform based on said comparison of said digital certificates;

searching one or more partitions based on said partitions pointed to by said communicated digital certificate contained in said template;

comparing said obtained biometric image of said template to said stored biometric images in said partition; and identifying said person based on said comparison of said biometric images.

29. The method of claim 28, wherein said step of identifying said person further comprises authorizing one of a level of access and an entitlement to use said computing platform based on said step of identifying.

30. The method of claim 28 wherein said step of obtaining an image of a biometric trait of said person further comprises obtaining an iris image of said person.

31. The method of claim 30 wherein said step of obtaining an iris image further comprising:

(a) illuminating an iris of said person;

(b) forming an approximately centered image of said iris at an image plane of a camera;

(c) storing said image in a memory;

(d) determining if said image is an image of sufficient quality; and (e) repeating steps (a) through (d) until said image of sufficient quality is obtained.

32. The method according to claim 28, wherein said communicating said template further comprises transmitting said template via a transmitter/receiver device at said computing platform over one of a wired and wireless connection, and receiving said template via a transmitter/receiver device at said certifying authority.

33. The method according to claim 28, wherein said authorizing further comprises communicating said authorization between said certifying authority and said computing platform using said transmitter/receiver device at said certifying authority, one of said wired and wireless connection, and said transmitter/receiver device at said computing platform.

34. A method of biometric database searching for authentication of an identity of a person to use one or more of a plurality of computing platforms, said method comprising:

(a) storing image information of an iris of at least one person's eye in a database that is separated into a plurality of partitions keyed to a digital certificate assigned to each of said plurality of computing platforms;

(b) illuminating an eye of an unidentified person having an iris;

(c) obtaining an image of said iris of said unidentified person;

(d) storing said image in a memory;

(e) determining if said image is an image of sufficient quality for a step (h) of comparing;

(f) repeating steps (b) through (e) until said image of sufficient quality is obtained;

(g) transmitting a template having said digital certificate and said iris image to a certifying authority and identity server;

(h) authenticating said computing platform based on said digital certificate portion of said template;

(i) accessing a partition of said database pointed to by said digital certificate;

(h) comparing said obtained image portion of said template with said stored image information to identify said unidentified person; and (i) identifying said person based on said step of comparing.

35. The method according to claim 34, further comprising authorizing said person to have one of a level of access and an entitlement to use said computing platform based on said step of identifying.

36. Computer-readable media being resident in one of a computing platform and a controlling authority having computer-executable instructions for performing the method of claim 34.

* * * * *